Patented Feb. 1, 1927.

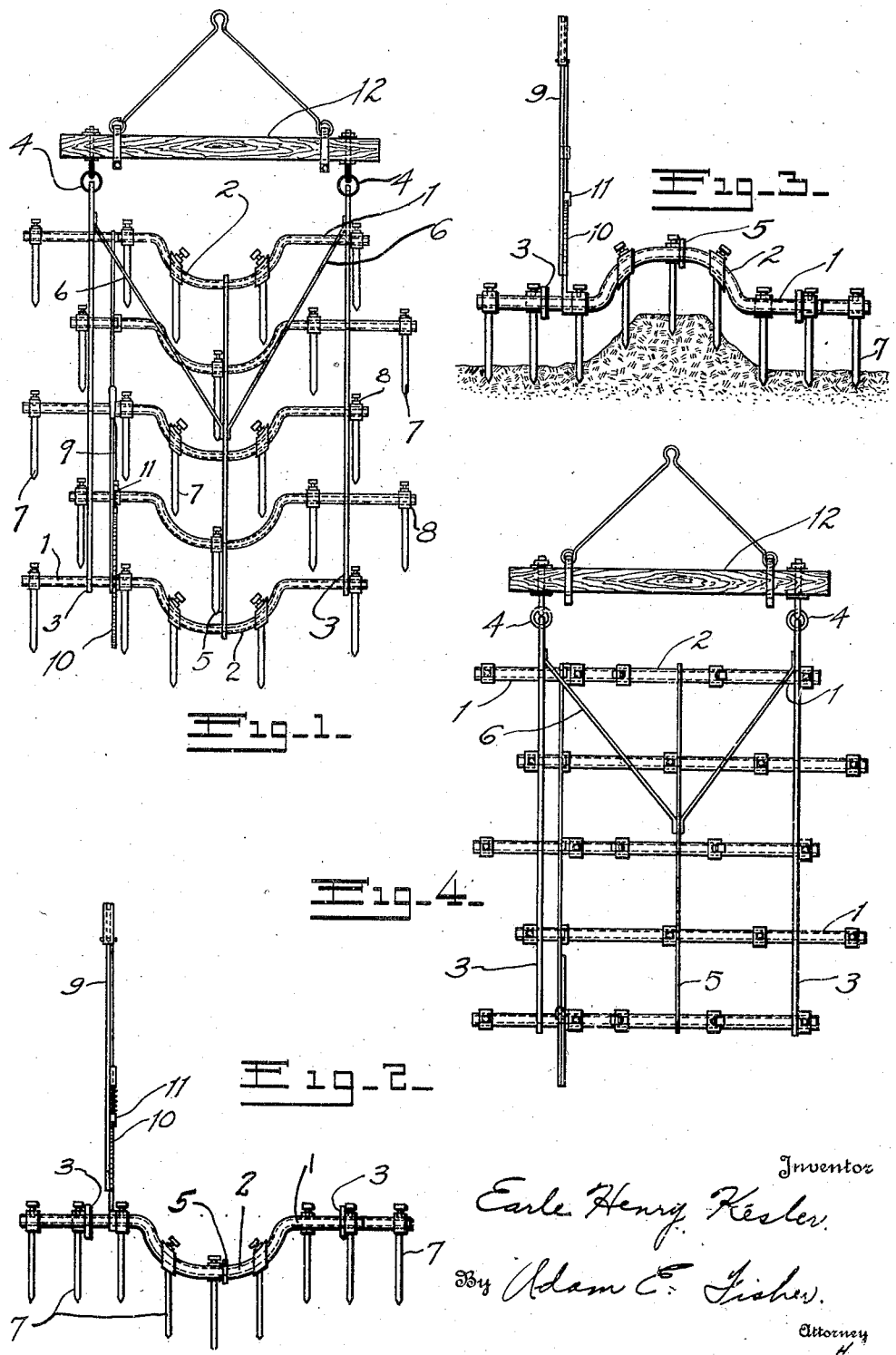

1,616,261

UNITED STATES PATENT OFFICE.

EARLE HENRY KESLER, OF BOISE CITY, OKLAHOMA.

HARROW.

Application filed June 9, 1926. Serial No. 114,642.

This invention relates to harrows particularly to the kind known as a lister harrow which in ordinary use drag the ground as well as harrow it.

The principal object of the invention is to provide a harrow of this nature which can be used to advantage for breaking the caked surface of the ground after the same has been seeded to permit the seeds to sprout thru the ground.

Another object is to provide a harrow which is constructed in such a manner as to permit converting the same to adapt it for harrowing a planted field formed with hills or furrows without destroying the said hills or furrows while breaking the crust which may be formed in the same.

Other objects and advantages of the device will be apparent from the accompanying drawing and specification.

In the drawing:

Figure 1 is a plan view of the harrow in a lowered position, as adapted for straddling a furrow.

Figure 2 is an end view of the harrow in a raised position, as adapted for straddling a furrow.

Figure 3 is an end view of the harrow in a raised position showing the same straddling a ridge or hill.

Figure 4 is a plan view of the harrow in a raised position, as shown in Figure 3.

In constructing and assembling the elements of my invention I provide a series of tubular bars 1 which are formed with medial U-shaped yokes 2. The said bars 1 are equally spaced from each other and pivotally bolted or otherwise secured to end cross bars 3 to permit raising and lowering them, and also to permit inverting them for straddling a ridge or a furrow. The said cross bars are formed at one end with hitching loops 4. A yoke bar 5 is pivotally bolted to the yokes 2 formed in the tubular bars 1 and is braced or strengthened by means of side braces 6 which are releasably secured to the said yoke bar 5 and the end cross bars 3. The said side braces 6 are directed forward, that is, they are secured to the end cross bars 3 at a point ahead of that at which they are secured to the yoke bar 5.

One end of the tubular bars 1 is alternately and considerably extended on either side of the cross bars 3. Teeth 7 are releasably and adjustably clamped to the tubular bars 1 and so arranged as to be alternately spaced with the teeth of the adjacent bar as shown at 8. The conventional ratchet, lever and time bar 9, 10 and 11 are mounted upon the rear tubular bars 1 for raising and lowering the said bars in the usual manner. The said harrow may be built in any desired number of sections and is provided with the usual draft beam 12.

In operation, the device is used in the same manner as the conventional harrows of this type for the ordinary preparations of the soil. However, after the prepared soil has once been seeded the conventional harrow is impractical for breaking the crust usually formed on the soil by a heavy rain and sunshine. The construction of this harrow permits it to be used in a level field for breaking the aforementioned crust as well as in a planted field where furrows and ridges are formed. In breaking the crust in a furrow the yokes 2 of the said harrow drop into the said furrow, thus loosening the ground and destroying the weeds which usually crop up in a furrow. For harrowing a ridge or hill the bars 1 are positioned as shown in Figure 3 so that the said yokes 2 straddle the ridge. It will be noted that this harrow can be applied for harrowing a field, planted with a crop which grows in ridges such as potatoes, corn, etc. after the crop has come up, by simply changing the center teeth, from a vertical to a horizontal position.

While I have herein described a certain specific method of constructing and assembling the elements of my invention, it is understood same may be varied in minor details, not departing from the spirit of my invention as defined in the appended claim.

I claim:

In a harrow of the kind described, the combination with cross bars provided with a draft beam and a raising and lowering mechanism of horizontal transverse bars pivotally secured to the said cross bars, the said transverse bars being formed with U-shaped yokes medially thereof with the terminal portions of the said transverse bars extending horizontally from the said yokes; a yoke bar pivotally connecting said yokes; forwardly extending converging braces releasably connecting said yoke bar and said cross bars; teeth adjustably and releasably mounted on said transverse bars on the yokes and terminal portions thereof; and means for releasably positioning the said tubular bars so that the said U-shaped yokes may be caused to project upwardly, downwardly or horizontally.

In testimony whereof I affix my signature.

EARLE HENRY KESLER.